United States Patent [19]

Burns

[11] 3,760,378

[45] Sept. 18, 1973

[54] SEMICONDUCTOR MEMORY USING VARIABLE THRESHOLD TRANSISTORS

[75] Inventor: Joseph Richard Burns, Trenton, N.J.

[73] Assignee: RCA Corporation, New York, N.Y.

[22] Filed: Sept. 2, 1971

[21] Appl. No.: 177,321

Related U.S. Application Data

[63] Continuation of Ser. No. 806,375, March 12, 1969, abandoned.

[52] U.S. Cl. .............. 340/173 R, 307/238, 307/279

[51] Int. Cl. .............................................. G11c 11/40

[58] Field of Search .................. 340/173 R, 173 FF, 340/173 PP; 307/238, 279

[56] References Cited

UNITED STATES PATENTS

| | | | |
|---|---|---|---|
| 3,508,211 | 4/1970 | Wegener | 340/173 R |
| 3,618,051 | 11/1971 | Oleksiak | 340/173 R |
| 3,623,023 | 11/1971 | Oleksiak | 340/173 R |

*Primary Examiner*—Terrell W. Fears
*Attorney*—H. Christoffersen

[57] ABSTRACT

A word-organized memory array employing at each storage location only a single metal-insulator-semiconductor device. Information is stored in a device by causing it to assume either a high or a low voltage threshold state. Information is read out by applying to a device a voltage lower than that required to switch the device from one state to another but of sufficient magnitude to cause a device to conduct when in one state but not when in the other. The write and read voltages are all of the same polarity and are applied to the devices in such a way that all devices may be integrated on a single substrate.

11 Claims, 4 Drawing Figures

INVENTOR.
Joseph R. Burns
BY H. Christoffersen
ATTORNEY

INVENTOR.
Joseph R. Burns
BY H. Christoffersen
ATTORNEY

SEMICONDUCTOR MEMORY USING VARIABLE THRESHOLD TRANSISTORS

RELATIONSHIP TO PREVIOUSLY FILED APPLICATION

This application is a continuation of Application Ser. No. 806,375 filed by the present inventor on Mar. 12, 1969, and now abandoned for Semiconductor Memory Using Variable Threshold Transistors and assigned to the assignee of the present application.

BACKGROUND OF THE INVENTION

Bistable active storage elements such as certain types of transistors, because, among other attributes, they are fast, small, potentially inexpensive and capable of integration, have been under active investigation for a number of years for memory devices of computers. However, it has been found difficult to organize the elements into a matrix array without requiring additional components to provide gating during the writing and reading cycles. The problems encountered include that of writing information into a particular element without disturbing data stored in the remaining elements and that of reading the information contained therein and without disturbing the information contained in the remaining elements.

A recent publication, "An Electrically Alterable Non-Volatile Semiconductor Memory" by R. E. Oleksiak, A. J. Lincoln, and H. A. R. Wegener, in the GOMAC PROCEEDINGS OF 1968, suggests one solution to the problem which, however, is not completely satisfactory. The memory described is a word-organized memory array using metal-nitride-semiconductor (MNS) bistable elements whose threshold voltage is controlled by applying a potential between the gate and the substrate of the elements. Modulating the substrate potential, as illustrated in FIG. 1, requires each row (equivalent to each digit line of a memory) to have its own local substrate which is electrically isolated from the local substrates of the other rows. While, as the article indicates, it is possible to integrate the array, the manufacturing process is involved and, therefore, expensive because of the extremely difficult extra diffusion required to provide the "wells" which isolate the local substrates from one another. It is also expensive because the added steps reduce the yield.

In the operation of the memory of the article above, while the source electrode of each element is connected to its associated substrate, the drain electrode is not energized during the writing cycle. This suggests that each element is treated as a parallel plate capacitor during the threshold voltage setting cycle. That is, the substrate is one plate, the gate electrode is the other plate, and the nitride layer between the gate and substrate is the insulator storing the charge. This mode of operation precludes the manufacturing of these arrays by the deposition or diffusion of transistors on insulator substrate material such as glass or sapphire.

As a direct consequence of applying the operating potential between the substrate and gate, rather than the gate, source and drain electrodes, Oleksiak et al., require that the voltage amplitude necessary to set an element to either the high or low threshold voltage be divided into two halves and that one-half of the voltage (half-select) be applied to the gate and the other half to the substrate of selected elements. Oleksiak et al., cannot, for example, ground the substrate of an element and apply the full select voltage to the gate of that same element (or vice-versa) without disturbing the state of other elements. This is best illustrated by referring to FIG. 1 which depicts the cited reference memory array using bistable P-type devices. A forward bias of 50 volts applied to the gate with respect to the substrate is required to set a device to its high threshold value ($V_{TH}$), and a reverse bias of 50 volts applied to the gate with respect to the substrate is required to set a device to its low threshold value ($V_{TL}$).

Assuming that element 1–1 is to be set to $V_{TH}$, +50 volts would be applied to the terminal marked B1, which applies +50 volts to every source and substrate connected to terminal B1 and the terminal WD1 would be connected to ground. This condition, however, disturbs non-selected elements along the row or column common to the selected element as an examination of the adjacent elements shows. Thus, grounding WD1 also applies a ground to the gate electrodes of elements 2–1, 3–1 and 4–1. Now, for the threshold level of element 2–1 to be undisturbed, the potential applied to its substrate, which is connected to and which is common to every element along row 2, must also be connected to ground. This, in turn, requires element 2–2, if it is to be undisturbed, to have its gate, which is connected in common to terminal WD2, to be returned to ground. Grounding WD2, however, also applies a ground to the gate of element 1–2. But note, that the source and substrate of element 1–2, which is connected to B1, is connected to +50 volts. It is, therefore, impossible to set just one element to $V_{TH}$ by applying ground potential to the substrate/source electrode and the full select amplitude to the gate electrode.

It is also impossible to set just one element to $V_{TL}$ by grounding the substrate and applying the full select voltage to the gate of a chosen element. Assume again that element 1–1 is to be set to $V_{TL}$. This requires the application of +50 volts to WD1 and ground potential to terminal B1. In order to maintain element 2–1 undisturbed, +50 volts has to be applied to its substrate and source which is common to terminal B2. Applying +50 volts to terminal B2 requires +50 volts to also be applied to the gate electrode of element 2–2 to prevent it from changing state. This requires terminal WD2 to be returned to +50 volts. But, since B1 is connected to ground, the gate to substrate of element 1–2 is reverse biased by 50 volts, which causes element 1–2 to switch state.

It has thus been shown that applying the full select voltage to one of the gate and the substrate while grounding the other one of the gate and substrate, affects every element along the column sharing that gate line or along the row sharing that local substrate, making it impossible to uniquely set one element at a time.

Oleksiak et al., therefore, have to divide the 50 volts into two halves (half-select voltage) about a reference potential. This necessitates a bidirectional source of potential which includes, for example, ground potential, +25 volts and −25 volts. +25 volts is applied to one of the gate and substrate of selected elements and −25 volts to the other one of the substrate and gate of the selected elements and the gate or source of unselected elements are grounded so that the non-selected elements sharing a row or a column with a selected element only have one half the select voltage (25 volts) applied to them.

The cited reference, therefore, needs during the write cycle a bidirectional source of potential which can provide a reference voltage and a positive and negative potential about the reference voltage. It should also be appreciated that each element sharing the column or row of a selected element is subjected to the stress of one-half the select voltage between its gate and substrate.

BRIEF SUMMARY OF THE INVENTION

A matrix array having rows and columns wherein each intersection of a row and a column defines a bit location. Each bit location comprises a single metal-insulator-semiconductor (MIS) bistable device of the type whose threshold voltage may be set to one of two values by applying either a relatively large forward bias or a relatively large reverse bias to the device. Each device has a gate electrode and first and second electrodes defining the ends of a conduction path. The gate electrodes of the devices in each row are returned to a separate control line, while the conduction path of each device is connected between a row and a column.

The threshold voltage of selected devices of the array is set to either one of two values, by a pulse of greater than a given amplitude applied between the control line and the rows and columns associated with the selected devices, in a direction to either forward bias the selected devices or reverse bias the selected devices. A second pulse of lower amplitude than said first pulse applied to selected devices in a direction to forward bias them may be used to non-destructively sample the information stored therein.

DETAILED DESCRIPTION

The semiconductor devices contemplated for use in practicing the invention have a variable threshold voltage which may be set to one of two values by applying a potential of greater than given amplitude between the gate and source electrodes of the device and which maintain the threshold voltage to which they are set for a considerable period of time. Included in this class of devices are variable threshold field-effect transistors having a metal-insulator-semiconductor (MIS) structure in which charge can be stored.

A specific, but not limiting, example of the above type of transistor is one whose insulating layer is silicon nitride and which is commonly referred to as an MNS (metal-nitride-silicon) device. This transistor may be fabricated using standard metal-oxide semiconductor (MOS) techniques, except that just prior to metalization, the channel oxide is made very thin and a nitride layer is deposited between the silicon channel and the gate of the device. The resulting transistor may be of either the P-type or the N-type and has first and second electrodes defining the ends of a conduction path and a gate electrode which is used to control the level of conduction in the conduction path. The transistor has the same general characteristics as a standard MOS device except that the addition of the insulating nitride layer over the thin oxide region allows charge to be stored within the insulating layer and results in the characteristic shown in FIG. 2.

Figure 1:
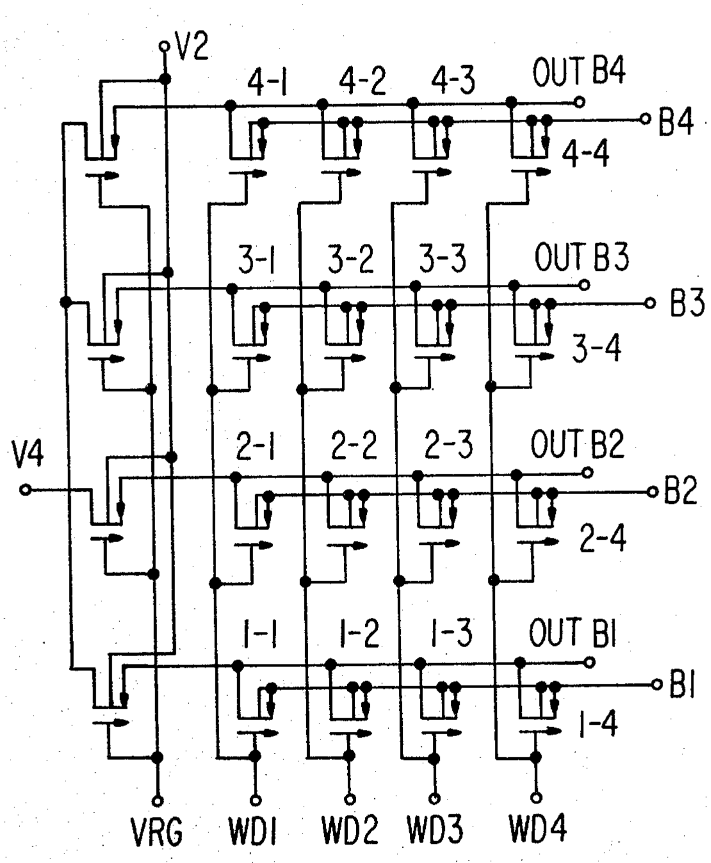
PRIOR ART FIG. 1
FIG. 1 is a schematic drawing of a matrix array according to the prior art.
Figure 2:
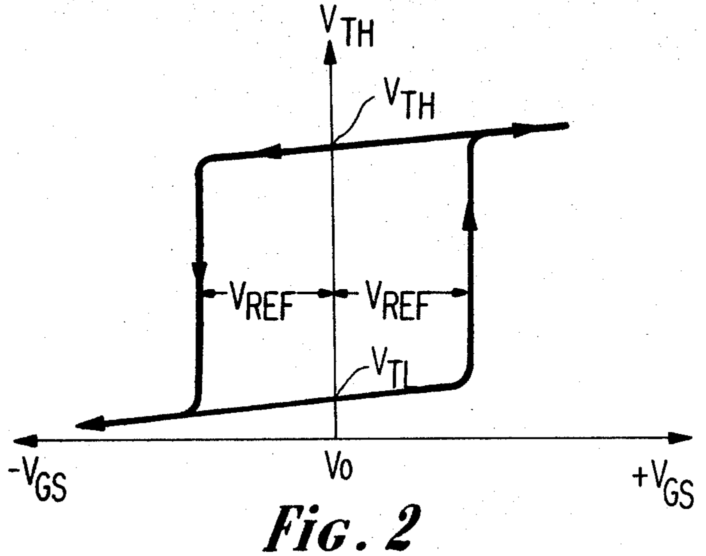
FIG. 2 is a plot of threshold voltage as a function of the applied gate-to-source voltage illustrating the bistable characteristic of the devices used to practice the present invention.

FIG. 2 is an idealized representation of the hysteresis characteristic of the threshold voltage ($V_T$) as a function of applied gate-to-source voltage ($V_{GS}$) of a typical device such as discussed above. The threshold voltage ($V_T$) is defined as the gate-to-source potential ($V_{GS}$) at which current may start to flow in the conduction path of the transistor. The point marked $V_{TL}$ refers to the low value of $V_T$ and the point marked $V_{TH}$ refers to the high value of $V_T$. $V_{TL}$ may, for example, be 2 volts and $V_{TH}$ may be 10 volts. The reference voltage $V_{REF}$ indicates the gate-to-source potential at which the transistor changes state. The values of $V_{REF}$ depend upon the particular device employed, however, for purposes of the present discussion they are assumed to be between ±5 and ±15 volts and typically may be ±12 volts.

Any value of $V_{GS}$ smaller than $|V_{REF}|$ does not substantially affect the threshold setting of the semiconductor device depicted in FIG. 2. However, if $V_T$ initially is $V_{TH}$, and $V_{GS}$ is made greater and more negative than $-V_{REF}$, the threshold voltage follows the hysteresis cuRve downward as shown in FIG. 2, and takes on the value of $V_{TL}$. When, and if, $V_{GS}$ is subsequently reduced to zero volts, $V_T$ remains set at $V_{TL}$. If the threshold voltage initially is $V_{TL}$ and $V_{GS}$ is made greater and more positive than $+V_{REF}$, the threshold voltage follows the hysteresis curve upward and $V_T$ takes on the value of $V_{TH}$. When, and if, $V_{GS}$ is subsequently reduced to $V_0 = 0$ volts, $V_T$ remains set at $V_{TH}$.

For the purpose of this application, the source electrode in an N-channel transistor is defined as that electrode, of the two electrodes defining the ends of the conduction path, having the lowest (least positive) potential applied thereto and the source electrode in a P-channel transistor is that electrode, of the two electrodes defining the ends of the conduction path, having the highest (most positive) potential applied thereto.

Arrays embodying the invention may have M rows and N columns where M and N are integers greater than one and M and N may or may not be equal. For ease of illustration in the array of FIG. 3(a), $M = N = 5$. Each intersection of a row and a column defines a bit location *i-j*, where *i* is the row number and *j* the column number. Each bit location is shown containing an N-channel MNS bistable transistor having a hysteresis characteristic of the type described in FIG. 2. Each transistor has one end of its conduction path, first electrode 12, connected to a column C*k* and the other end of its conduction path, second electrode 13, connected to a row R*p*. There is also a control line conductor G*q* for each row to which the gate electrodes of the transistors of that row are connected, where *k*, *p* and *q* are integers.

The five columns C1, C2, C3, C4 and C5 may be connected during the writing cycle to either a terminal 1 or a terminal 2, and during the sense cycle to data output terminals 41, 42, 43, 44, or 45, respectively. The data output terminals 41–45 are respectively connected through output impedances, shown as resistors, 51, 52, 53, 54, 55, to terminal 3. The rows R1, R2, R3, R4 and R5 may each be connected to either terminal 1 or terminal 2 and the control lines G1, G2, G3, G4 and G5 may each be connected to either terminal 1, terminal 2, or terminal 3.

Terminals identified by the same number are connected together to the same potential point. This is illustrated in FIG. 3 (b), where the power supplied in the dashed box 20 are shown as two batteries 100 and 102. An important feature of the present arrangement is that both batteries produce voltages of the same polarity and that only a unidirectional source of potential is needed during the write cycle. All terminals 1 are connected to ground; all terminals 2 are connected to a positive terminal of battery 100; and all terminals 3 are connected to a positive terminal of battery 102. The amplitude of the voltage $+V_1$ applied to terminal 2 is greater than $|V_{REF}|$ and, for example, may be +20 volts. The amplitude of voltage $V_2$ is greater than $V_{TL}$ but less than $|V_{REF}|$ and if $|V_{REF}|$ is greater than $V_{TH}$, then $V_2$ is made less positive than $V_{TH}$, [$V_{TL}<V_2<V_{REF}$ or $V_{TH}$]. Some typical examples of such voltages are $V_{TL} = 2$ volts, $V_2 = 5$ volts, $V_{REF} = \pm 12$ volts, $V_{TH} = 10$ volts.

In a preferred mode of operation of the matrix of FIG. 3 (a), the threshold voltage of all elements of the array is first set to $V_{TH}$. This is done by connecting all control lines to terminal 2 (+20 volts) and all rows and columns to terminal 1 (ground). This causes each device to be forward biased sufficiently so that its $V_{GS}$ greatly exceeds $+V_{REF}$. Though it is not essential to maintain electrodes 12 and 13 at the same potential during the $V_{TH}$ setting interval, doing so prevents any current from flowing in the conduction path. When the positive potential applied to the gate is removed, the threshold voltage of each set transistor remains at $V_{TH}$, and it will not conduct unless the amplitude of the voltage applied to the gate exceeds the source potential by more than $V_{TH}$.

After the setting operation, one or more selected elements may be reset to the low threshold state $V_{TL}$. A voltage of +20 volts is applied to the source and drain electrodes of the selected element,and its gate electrode is connected to ground. For example, if it is desired to reset element 1–1 of FIG. 3 (a), control line G1 is connected to terminal 1 (ground) and row R1 and column C1 are each connected to terminal 2 (+20 volts), while all remaining rows, columns and control lines are connected to terminal 1 (ground). These potentials reverse bias the gate electrode 11 of transistor 1–1 with respect to both of its electrodes 12 and 13 by a potential ($V_1 = 20$ volts) of greater value than the reference voltage ($V_{REF} = 12$ volts). After these voltages are removed, element 1–1 remains in its low voltage threshold state $V_{TL}$.

During the time a selected element such as 1–1 is reset to $V_{TL}$, the remaining elements of the matrix array are not disturbed. The elements not in the first row or first column have their three electrodes connected to terminal 1 (ground potential) and obviously are undisturbed. The theshold voltage of the remaining elements in column 1 is unchanged because the gate-to-source voltage of these elements is kept at zero volts. Each of the remaining elements in column 1 has one electrode 12 connected to $+V_1$ (20 volts), while its gate 11 and its other electrode 13 are gounded. As defined above, electrode 13 being at the lowest potential is the source electrode and since $V_{GS} = 0$, the threshold voltage is unchanged since raising the drain potential a moderate amount such as the 20 volts mentioned above when $V_{GS} = 0$ does not affect the charge storage mechanism. Subjecting the non-selected elements to this non-disturbing bias condition, which permits the simplicity of the disclosed circuit, was not appreciated or used in the prior art.

Each of the remaining elements along row R1 has its gate electrode and first electrode 12 connected to terminal 1 (ground potential), and its other electrode 13 connected to terminal 2 (+20 volts) via row R1. Therefore, these elements are also biased as above except that electrodes 12 and 13 are interchanged. Since the transistors are bilateral devices, the drain electrode and the source electrode are interchangeable and, as defined above, electrode 12 is now the source electrode. Since $V_{GS} = 0$ the threshold voltage of the remaining elements along row R1 remains unchanged.

An analysis similar to the above can be made to show that it is possible to reset any other number—two, three, four or five—of elements in the same row at a time without disturbing the remaining elements in the matrix array. All that is necessary is to connect the row conductor to terminal 2 (+20 volts) the control line associated with that row to terminal 1 (ground) and the column conductors for the transistors in the row it is desired to reset to terminal 2 (+20 volts).

The threshold level of the elements may be sensed a row at a time by connecting columns C1, C2, C3, C4 and C5, respectively, to data output terminals 41, 42, 43, 44, and 45, connecting all rows and the control lines of the non-selected rows to terminal 1 (ground) and connecting the control line of the selected row to terminal 3 (+5 volts).

Assume row 1 is to be read out and that element 1–1 is set to $V_{TL}$ and the remaining elements 1–2 . . . 1–5 are set to $V_{TH}$ . Since the potential ($V_2 = +5$ volts) applied to the gate of element 1–1 is above the threshold voltage ($V_{TL} = +2$ volts) of element 1–1 ($V_{TL}<V_2$), element 1–1 will conduct and the voltage at data output point 41 will be low (close to ground). However, since the gate potential ($V_2$) of elements 1–2, 1–3, 1–4, and 1–5 is below the threshold level ($V_{TH} = +10$ volts) of these transistors ($V_2<V_{TH}$), they cannot conduct and the voltage level at data output points 42, 43, 44, and 45 will remain at $+V_2 = 5$ volts. It should be appreciated that the elements may be current sensed by coupling the columns through a low impedance and sensing the presence or absence of current.

Since the read out gate voltage $V_2$ is lower than the value of reference voltage ($V_{REF}$) which causes a transition in the threshold voltage, any and all elements may be read out without disturbing either the state of the elements read out or the state of non-selected elements.

It has thus been shown that a single bistable element may be used in each bit location and that information may be stored therein and read out non-destructively.

The matrix array described above is ideally suited for use as a word-organized memory array wherein each row of the matrix would, for example, contain a word of information. The high ($V_{TH}$) and low ($V_{TL}$) threshold levels may be defined to represent storage of binary one and zero, respectively, or vice versa. An important feature of such a memory is that the stored information is unaffected by the removal of power.

The rows, columns and control lines of the array have been shown connected to terminal points by means of switches. These switches may be of the momentary type, and it is intended that the combination of the voltage source and the switches also represent pulse sources having the amplitude and polarity of the voltages shown in FIG. 2.

It should also be noted that a source of voltage of one polarity (potential source 100 provides $+V_1$ and ground and potential source 102 provides $+V_2$ and ground) has been used to write and to sense data in the embodiment shown in FIG. 3 and that such a source of potential in combination with the switches is equivalent to a pulse generator having one polarity pulses and of amplitude approximately equal to $V_1$ for writing and to $V_2$ for sensing. This is in marked contrast to the bidirectional source needed in the prior art to set and reset the elements.

Figure 3A:
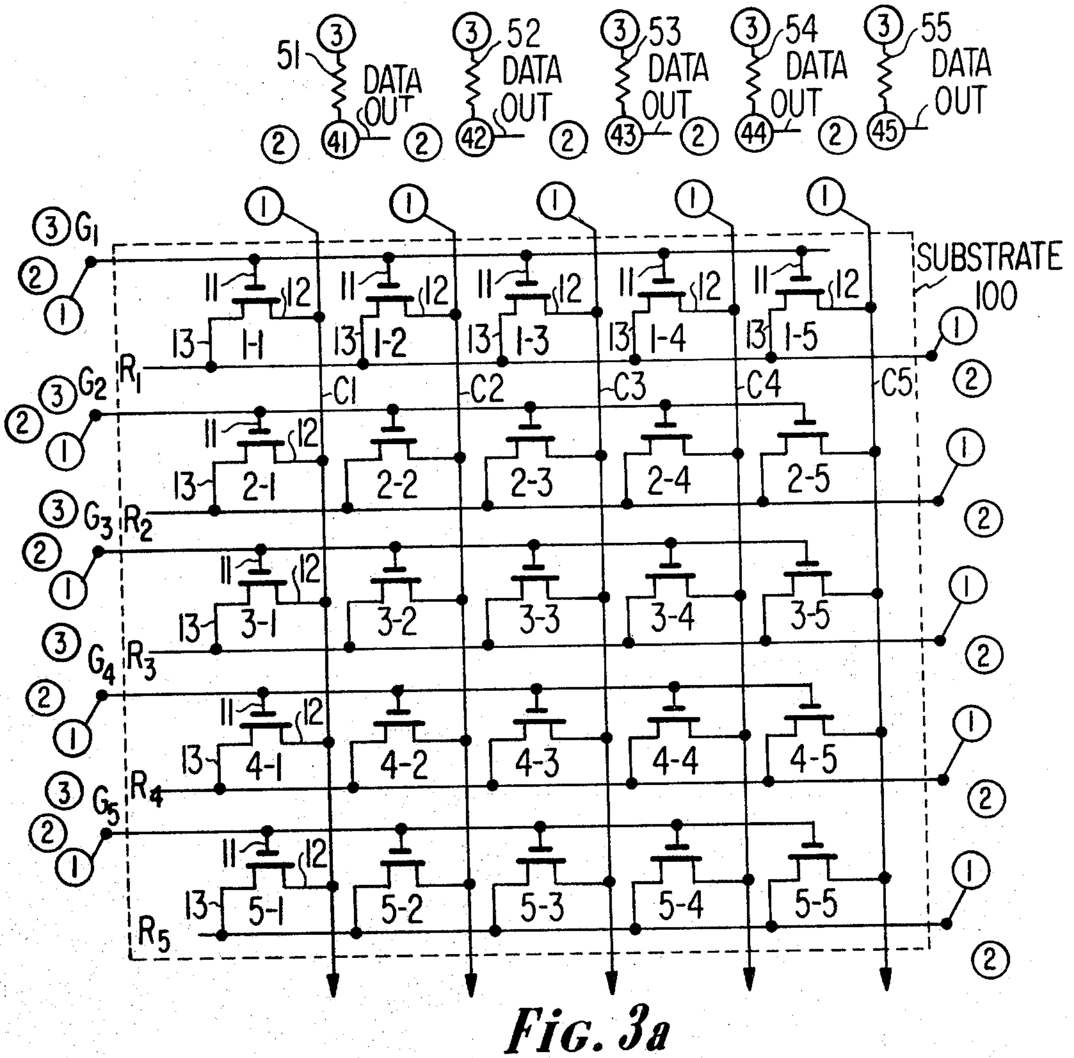
FIGS. 3 (a) and 3 (b) are, respectively, schematic drawings of a matrix array embodying the invention and the voltages necessary for the write and read cycles of the array.
Figure 3B:
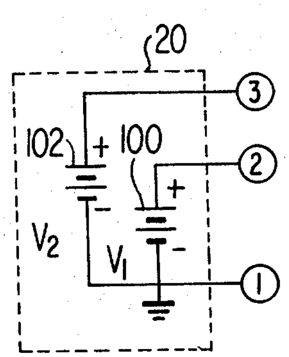

The transistors of FIG. 3*a* are on a common substrate 100 shown by dashed line, and the latter may be an insulator substrate. For example, thin-film transistors evaporated on a glass substrate or silicon transistors epitaxially grown on sapphire (SOS) may be employed so long as the transistors have the general characteristics displayed in FIG. 2.

It should also be appreciated that the non-selected elements have their gate-to-source potential maintained at zero volts which enhances the operation of the array by minimizing the stresses on the charge storage mechanism.

It should be obvious that data could also be obtained from the rows with the columns either returned to ground or some other potential. Due to the symmetry of the devices, the rows and columns are interchangeable and the control lines may run electrically parallel to either the rows or the columns.

The transistors used in the embodiments shown in FIG. 3 have been described as being of the N-type. It is obvious that these transistors could as well have been of the P-type so long as their threshold voltage have the characteristics shown in FIG. 2, and that the voltages be applied in the opposite direction than was the case for the N-type devices.

What is claimed is:

1. In combination:

a matrix array of electrically variable threshold field-effect semiconductor devices formed on a common substrate and arranged in rows and columns, each device of the type having at least two threshold levels, said devices having a control electrode and first and second electrodes defining the ends of a conduction path;

a column conductor per column directly connected to the first electrodes of the devices of the column;

a row conductor per row directly connected to the second electrodes of the devices of the row;

a control line per row directly connected to the control electrodes of the devices of the row;

means for applying a first voltage to the column conductors and row conductors and a second voltage to the control lines of selected ones of the devices to set them to a first threshold state, and means for applying said second voltage to the column and row conductors and said first voltage to the control lines of selected ones of the devices to set them to a second threshold state; and means coupled to said row and column conductors and to said control lines for selectively non-destructively sensing the state of selected devices.

2. The combination as claimed in claim 1, wherein said substrate is an insulator.

3. The combination as claimed in claim 2, wherein said substrate material is selected from the group consisting of glass and sapphire.

4. The combination as claimed in claim 1, wherein said second voltage is a reference potential and wherein the potential difference between said first voltage and said second voltage is greater in magnitude than the highest threshold voltage of the devices.

5. The combination comprising:

a matrix array of electrically variable threshold insulated-gate field-effect transistors directly connected to a common substrate arranged in rows and columns, each transistor having a control electrode and first and second electrodes defining the ends of a conduction path and each conduction path being coupled between a row and a column, each transistor being of the type which in response to a voltage of greater than a given reference value applied between the control and first electrodes in a direction to cause conduction exhibits a first threshold level and which in response to a voltage of greater than a given reference value applied between its control and first electrodes in a direction to inhibit conduction exhibits a second threshold level;

a plurality of control lines, equal in number to the number of rows, each line connected to the control electrodes of the transistors of a different row; and means for setting the threshold voltage of at least one selected transistor to one of said first and second threshold levels including means for applying one of a first and a second potential to the control line of said selected transistor and the other one of said first and second potentials to the row and column connected to said selected transistor, said first and second potentials differing by more than said given reference value.

6. The combination as claimed in claim 5, wherein said setting means includes means for applying a common potential to the control electrodes and to at least one of said first and second electrodes of each non-selected transistor for rendering said non-selected transistors nonconducting.

7. The combination as claimed in claim 6 wherein said setting means includes means for first setting all of said devices to said first threshold level and for then setting selected ones of said devices to said second threshold level.

8. The combination as claimed in claim 6, wherein said setting means includes means for first applying said first potential to the control lines of selected transistors and said second potential to the rows and columns connected to said selected transistor to establish said first threshold level in the selected transistors; and means for then applying said second potential to the control lines of selected transistors and said first potential to the rows and columns associated with said selected transistors to establish said second threshold level in said selected transistors.

9. The combination as claimed in claim 8, wherein said second potential is ground potential and said first potential is positive with respect to ground.

10. The combination as claimed in claim 9, further providing means for selectively applying read voltages between the control line and the row of selected transistors, said read voltages having a value between said second threshold level and said first threshold level; and means coupled to each column for sensing the output of said transistors in response to said read voltages.

11. The combination comprising:

a word-organized memory array of electrically variable threshold insulated-gate field-effect transistors connected to a common substrate arranged in rows and columns, wherein each row stores the digits of a word;

each transistor having a control electrode and first and second electrodes defining the ends of a conduction path, said conduction path being coupled between a row and a column, and each transistor being of the type which in response to a forward biasing voltage of greater than a given reference value applied between the control and first electrodes exhibits a high threshold level and which in response to a reverse biasing voltage of greater than a given reference value applied between its control and first electrodes exhibits a low threshold level;

a separate control line connected to the control electrodes of the transistors of each row;

a unidirectional source of potential having an amplitude greater than said reference value; and means for applying said source of potential between the control line and the rows and columns of selected transistors in a direction to forward bias said control electrode with respect to said first and second electrodes and then applying said source of potential between the control line and the rows and columns of selected transistors in a direction to reverse bias said control electrode with respect to said first and second electrodes.

* * * * *